United States Patent
Horiuchi et al.

(10) Patent No.: US 8,452,229 B2
(45) Date of Patent: May 28, 2013

(54) RADIO COMMUNICATION APPARATUS AND RELAY TRANSMISSION METHOD

(75) Inventors: Ayako Horiuchi, Kanagawa (JP);
Kenichi Miyoshi, Kanagawa (JP);
Hiroaki Morino, Tokyo (JP)

(73) Assignee: Panasonic Corporation, Osaka (JP)

( * ) Notice: Subject to any disclaimer, the term of this patent is extended or adjusted under 35 U.S.C. 154(b) by 741 days.

(21) Appl. No.: 12/280,966

(22) PCT Filed: Feb. 27, 2007

(86) PCT No.: PCT/JP2007/053659
§ 371 (c)(1),
(2), (4) Date: Aug. 27, 2008

(87) PCT Pub. No.: WO2007/102344
PCT Pub. Date: Sep. 13, 2007

(65) Prior Publication Data
US 2009/0036051 A1 Feb. 5, 2009

(30) Foreign Application Priority Data
Feb. 28, 2006 (JP) ................. 2006-053900

(51) Int. Cl.
H04B 3/36 (2006.01)
(52) U.S. Cl.
USPC .............. 455/7; 370/315; 714/746; 714/751; 714/758; 714/800
(58) Field of Classification Search
USPC ..... 455/7–11.1, 14–25, 63.1, 67.13; 370/315; 714/746–747, 751–758, 800
See application file for complete search history.

(56) References Cited

U.S. PATENT DOCUMENTS

| | | | | |
|---|---|---|---|---|
| 7,137,060 B2 * | 11/2006 | Yu et al. | ......................... | 714/794 |
| 7,623,490 B2 * | 11/2009 | Khandekar et al. | ............ | 370/329 |
| 7,809,021 B2 * | 10/2010 | McClellan | .................... | 370/476 |
| 2003/0104788 A1 * | 6/2003 | Kim | .............................. | 455/67.3 |
| 2008/0310348 A1 * | 12/2008 | Nandagopalan et al. | ..... | 370/328 |

OTHER PUBLICATIONS

International Search Report dated May 29, 2007 in English.
T. Miyano et al., "Cooperative Relaying Technique with Space Time Block Code for Multihop Communications among Single Antenna Terminals," Technical Report of IEICE, The Institute of Electronics, Information and Communication Engineers, Mar. 2004, A•P2003-342, RCS2003-365, pp. 71 to 76.
Mohammad Janani et.al., "Coded Cooperation in Wireless Communications: Space-Time Transmission and Iterative Decoding," IEEE Transactions on Signal Processing, vol. 52, No. 2, 2004.02, pp. 362-371.

(Continued)

Primary Examiner — Raymond Dean
(74) Attorney, Agent, or Firm — Dickinson Wright PLLC (57) ABSTRACT

Provided is a relay transmission method capable of obtaining the diversity effect even when a relay station has detected an error in a relay signal when performing communication between a base station and a mobile station via a relay station. In the relay station used in this method, a decoding unit (104) performs error-correction-decoding of a systematic bit by performing repeated decoding such as a turbo decoding by using a parity bit and obtains a decoding result formed by a systematic bit after the error-correction-decoding. An error judging unit (105) judges whether the decoded result has an error by using CRC (Cyclic Redundancy Check). An encoding unit (106) performs error-correction-encoding of the decoded result and obtains a systematic bit after error-corrected-encoded and a parity bit. A selection unit (107) selects the decoded result inputted from the decoding unit (104) or the bit string inputted from the encoding unit (106) according to the judgment result obtained by the error judging unit (105) and outputs it to a modulation unit (108).

6 Claims, 9 Drawing Sheets

OTHER PUBLICATIONS

Tsuyoshi Miyano, "Tan'ichl Antena Tanmatsukan Multi Hop Tsushin ni okeru STBC o Riyo shita Kyoryoku Chukei Hoshiki," IEICE Technical Report, vol. 103, No. 682, pp. 71 to 76.

Ayako Iwata et al., "Jushin Hinshitsu ni Ojite Chukeikyoku o Sentaku sural Multi Hop System," IEICE Technical Report, vol. 105, No. 356, Oct. 20, 2005, pp. 121 to 126.

* cited by examiner

RADIO COMMUNICATION APPARATUS AND RELAY TRANSMISSION METHOD

TECHNICAL FIELD

The present invention relates to a radio communication station apparatus and relay transmission method.

BACKGROUND ART

In recent years, with the multimediatization of information in cellular mobile communication systems as represented by mobile phones for example, transmitting large capacity data such as still images and movies in addition to speech data becomes popular in recent years. To realize the transmission of high capacity data, a technology in which a high-frequency radio band is used to obtain a high transmission rate is studied actively.

However, when a high-frequency radio band is used, although a high transmission rate can be expected in a short distance, attenuation due to transmission distance becomes greater as the distance increases. Accordingly, when the mobile communication system employing a high-frequency radio band is actually operated, the coverage area of each radio communication base station apparatuses (hereinafter "base station") becomes small, which thus requires that a larger number of base stations be set up. Since the set-up of base stations involves large costs, a technology is strongly demanded for realizing communication services which employ a high-frequency radio band and preventing an increase in the number of base stations.

To address this demand, various relay technologies are investigated in which radio communication relay station apparatuses (hereinafter "relay stations") are set up between a radio communication mobile station apparatus (hereinafter "mobile station") and a base station, and communication between the mobile station and the base station is carried out via these relay stations.

Moreover, as one of relay technologies, communication between a base station and a mobile station is carried out via a plurality of relay stations simultaneously. The technology enables to obtain diversity effect by performing relay transmission in cooperation of a plurality of relay stations and by receiving signals from a plurality of relay stations by a base station and a mobile station of signal receiving side.

Moreover, a relay technology is disclosed that, to prevent propagation of errors in relay-transmission, the relay station detects errors in a relay signal and does not relay the signals having errors (see non-patent document 1).

Non-patent Document 1: "Cooperative Relaying Technique with Space Time Block Code for Multihop Communications among Single Antenna Terminals," technical report of IEICE, The Institute of Electronics, Information and Communication Engineers, March 2004, A•P2003-342, RCS2003-365, pp. 71 to 76

DISCLOSURE OF INVENTION

Problems to be Solved by the Invention

However, according to the relay technology disclosed in non-patent document 1, signals having errors are not relay-transmitted to the base station or the mobile station of the signal receiving side, and so, although propagation of errors can be prevented, diversity effect cannot be obtained in the base station or the mobile station.

It is therefore an object of the present invention to provide a radio communication station apparatus and relay transmission method that can obtain diversity effect even when a relay station detects error in a relay signal.

Means for Solving the Problem

The radio communication apparatus of the present invention is a radio communication apparatus that performs relay transmission between a first radio communication apparatus and a second radio communication apparatus and adopts a configuration including: a receiving section that receives a first data symbol formed with first systematic bits and first parity bits subjected to error correcting encoding, from the first radio communication apparatus; a demodulating section that demodulates the first data symbol to acquire the first systematic bits and the first parity bits; a decoding section that performs error correcting decoding on the first systematic bits using the first parity bits to acquire a decoding result formed with the second systematic bits after the error correcting decoding; an error determining section that determines whether or not there are errors in the decoding result; a modulating section that generates a second data symbol including the second systematic bits when there are errors in the decoding result; and a transmitting section that transmits the second data symbol to the second radio communication apparatus.

Advantageous Effect of the Invention

The present invention provides an advantage of obtaining diversity effect even when a relay station detects errors in a relay signal.

BEST MODE FOR CARRYING OUT THE INVENTION

Now, embodiments of the present invention will be described in detail with reference to the accompanying drawings. The radio communication apparatus that will be explained below includes relaying a signal transmitted from a first radio communication apparatus to a second radio communication apparatus, and, for example, is mounted in a relay station used in mobile communication systems. In the following embodiments, the radio communication apparatus that relays signals will be described as a "relay station," the first radio communication apparatus will be described as a "mobile station," and the second radio communication apparatus will be described as a "base station."

Figure 1:
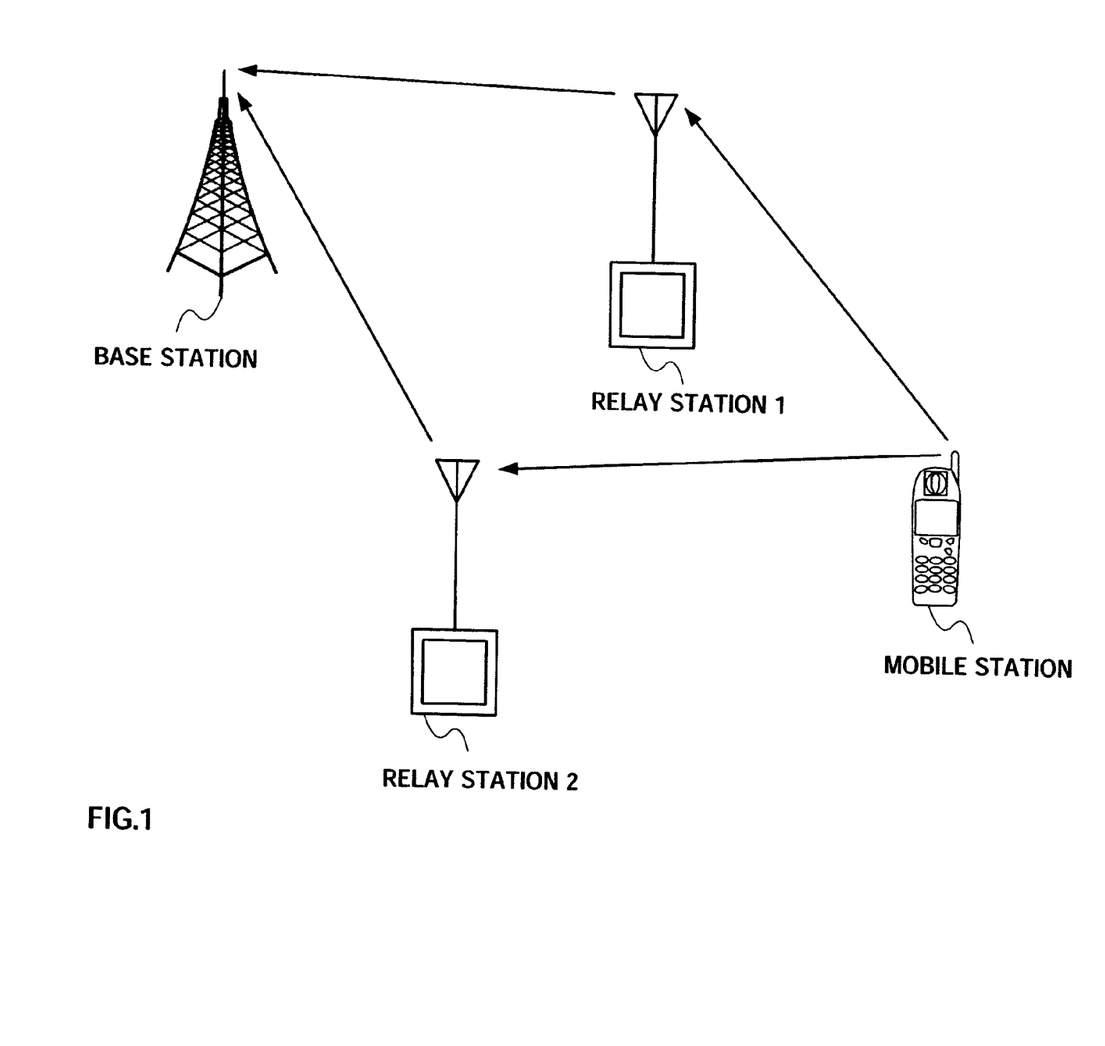
FIG. 1 is a configuration diagram of the mobile communication system according to the embodiments.

Moreover, in the mobile communication system according to the embodiments below, as shown in FIG. 1, there are a plurality of relay stations (relay station 1 and relay station 2) that relay transmission signals from the mobile station to the base station. Furthermore, a plurality of such relay stations relay signals in cooperation. The mobile station, the relay station and the base station synchronically transmit and receive signals having a predetermined duration in frame units.

Moreover, in the mobile communication system, the mobile station performs error correcting encoding on transmission data (bit sequence) using systematic codes including turbo code. By error correcting encoding on the transmission bit sequence using systematic codes, the mobile station encodes the transmission bit sequence into systematic bits, which are transmission bits themselves, and parity bits, which are redundancy bits. Accordingly, data symbols transmitted from the mobile station to the relay station are formed with systematic bits and parity bits subjected to error correcting encoding. After the relay station receives and demodulates these data symbols, the relay station performs error correcting decoding on the systematic bits using the parity bits through iterative decoding including turbo decoding and acquires systematic bits after error correcting decoding.

The relay station according to the embodiments below may be set in advance, and other mobile stations may be used for the relay stations like the ad-hoc network (e.g. see Japanese Patent Application Laid-Open No. 2001-189971).

(Embodiment 1)

In iterative decoding such as turbo decoding, the reliability of decisions is improved and error rate performances are improved by decoding iteratively using reliability information of a decoding result (e.g. likelihood information). Accordingly, if iterative decoding is used in error correcting decoding, even when there are bits with errors in a decoding result, the number of such bits is small and the decoding result is likely to be virtually correct. That is, if iterative decoding is used in error correcting decoding, even when errors are detected in decoding result through CRC (Cyclic Redundancy Check) and so on, only part of the systematic bits with errors is included in the decoding result, and so it is likely that most of the systematic bits are correct. Accordingly, this decoding result is set in a relay transmission target even when there are errors, so that the base station can obtain diversity effect for systematic bits. Moreover, due to diversity effect, the base station can adequately correct the errors upon error correcting decoding, so that it is possible to prevent propagation of errors.

Then, when there are errors in a decoding result formed with systematic bits after error correcting decoding, the relay station of the present embodiment transmits data symbols including the systematic bits to the base station.

Figure 2:
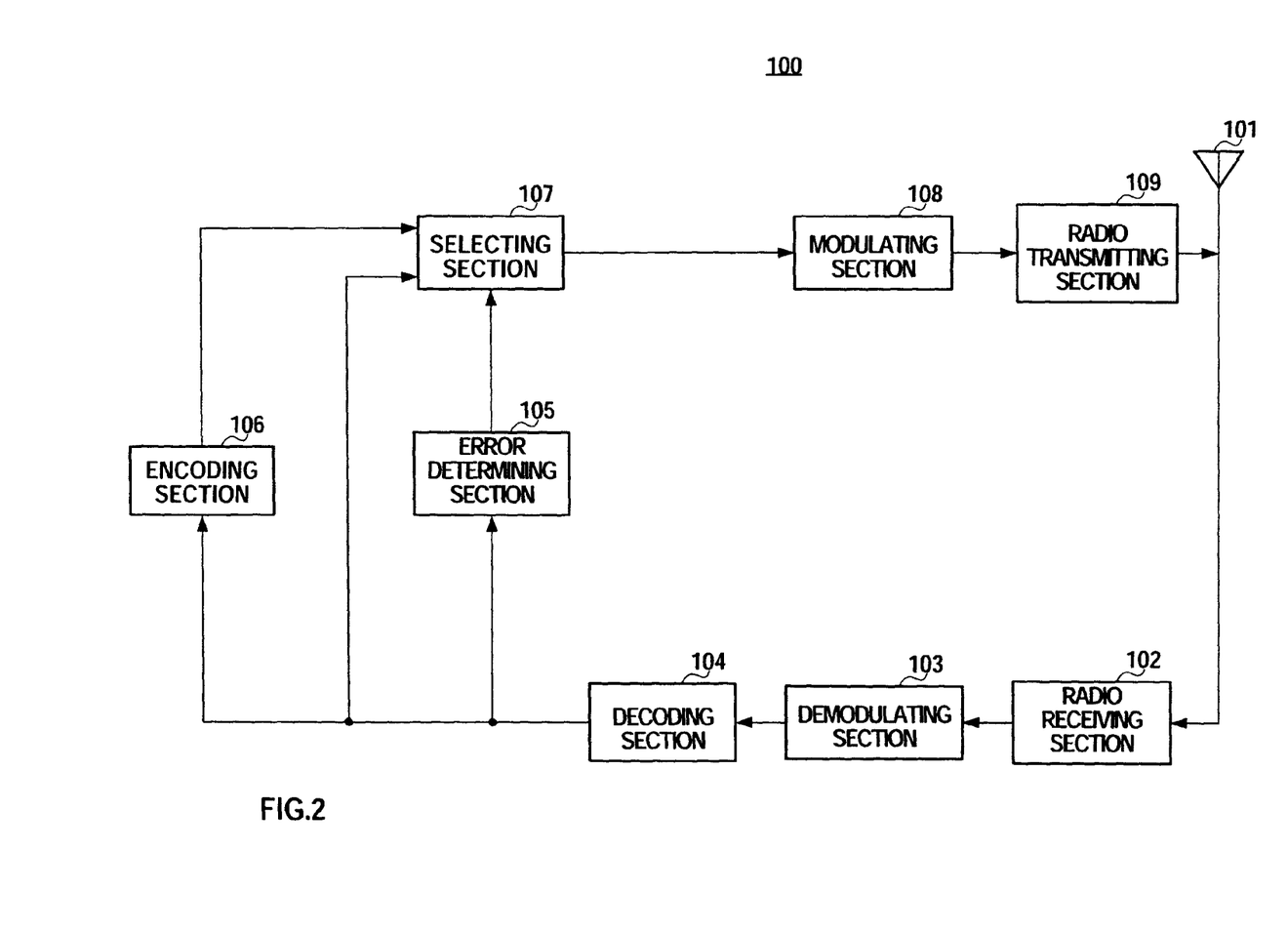
FIG. 2 is a block diagram showing a configuration of the relay station according to Embodiment 1.

FIG. 2 shows the configuration of relay station 100 of the present embodiment. Above-described relay station 1 and relay station 2 have the same configurations. The following explanation will be limited to uplink relay-transmission, but downlink relay-transmission may be carried out as uplink relay-transmission.

In relay station 100, radio receiving section 102 receives data symbols transmitted from the mobile station via antenna 101, performs radio processing including down-conversion and outputs the data symbols to demodulating section 103.

Figure 3:
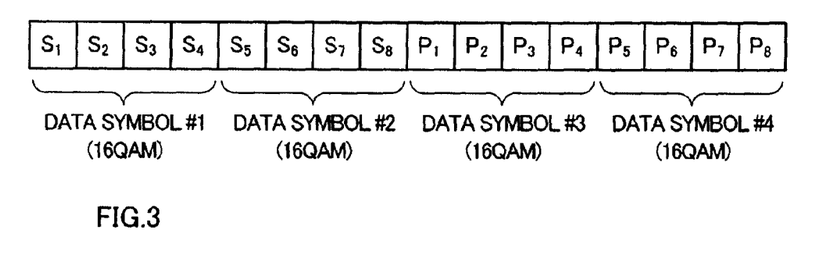
FIG. 3 illustrates received data symbols according to Embodiment 1.

FIG. 3 shows data symbols #1 to #4 received in radio receiving section 102. As shown in this figure, received data symbols #1 to #4 are formed with systematic bits (S) and parity bits (P) subjected to error correcting encoding. Here, the coding rate R for error correcting encoding in the mobile station is 1/2. That is, the ratio between systematic bits and parity bits is 1:1. Additionally, here, 16 QAM is used as modulation scheme in the mobile station.

Demodulating section 103 demodulates received data symbols #1 to #4, to acquire systematic bits $S_1$ to $S_8$ and parity bits $P_1$ to $P_8$, and outputs the systematic bits and parity bits to decoding section 104.

Figure 4:
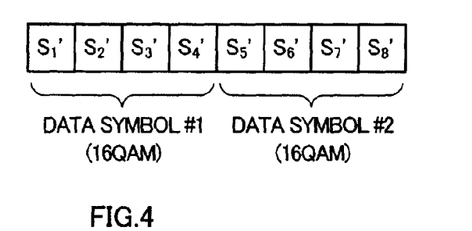
FIG. 4 illustrates a decoding result according to Embodiment 1 (modulation scheme: 16QAM)

Decoding section 104 performs error correcting decoding on the systematic bits using the parity bits through iterative decoding including turbo decoding, to acquire a decoding result formed with the systematic bits after error correcting decoding. Decoding section 104 performs error correcting decoding on systematic bits $S_1$ to $S_8$ using parity bits $P_1$ to $P_8$, and, as shown in FIG. 4, acquires the decoding result formed with systematic bits $S_1'$ to $S_8'$ after error correcting decoding. Then, decoding section 104 outputs this decoding result to error determining section 105, encoding section 106 and selecting section 107.

Error determining section 105 determines whether or not there are errors in the decoding result using CRC. That is, error determining section 105 determines whether or not there are systematic bits $S_1'$ to $S_8'$ with errors. Then, error determining section 105 outputs the determination result ("NG" when there are errors and "OK" when there are no errors) to selecting section 107. Whether or not there are errors is usually determined on a per frame basis.

Figure 5:
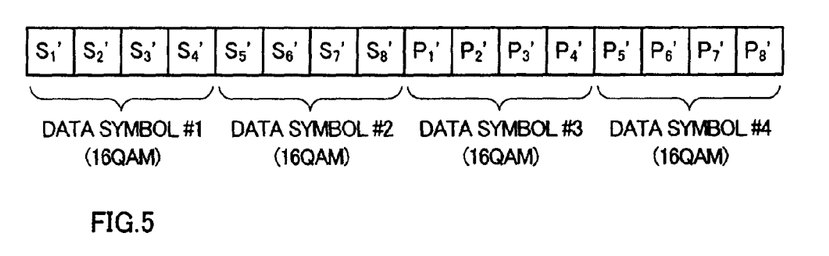
FIG. 5 illustrates a bit sequence after encoding according to Embodiment 1.

Encoding section 106 performs error correcting encoding on the decoding result to acquire systematic bits and parity bits subjected to error correcting encoding. Encoding section 106 performs error correcting encoding on the decoding result using systematic codes including turbo encoding. The coding rate R here is 1/2 is the same as the coding rate in the mobile station. That is, as shown in FIG. 5, error correcting encoding in encoding section 106 produces acquiring systematic bits $S_1'$ to $S_8'$, which are the decoding result itself, and parity bits $P_1'$ to $P_8'$, which are new redundancy bits. Then, encoding section 106 outputs this bit sequence to selecting section 107.

According to the determination result in error determining section 105, selecting section 107 selects either the decoding result (FIG. 4) inputted from decoding section 104 or the bit sequence (FIG. 5) inputted from encoding section 106 and outputs the selected result to modulating section 108.

Here, error detection using CRC usually can determine whether or not there are errors in a decoding result, but is unable to detect bits with errors in the decoding result or the number of bits with errors. Accordingly, even when it is determined that there are errors in the decoding result by error determining section 105, as described above, only part of systematic bits $S_1'$ to $S_8'$ has errors, and it is likely most of the systematic bits are without errors.

Then, if there are errors in the decoding result (FIG. 4) in decoding section 104 (if the error determination result is "NG"), selecting section 107 selects the decoding result and outputs it to modulating section 108. That is, if there are errors in the decoding result in decoding section 104, as shown in FIG. 4, modulating section 108 generates data symbols #1 and #2 formed with systematic bits $S_1'$ to $S_8'$ alone by modulating the decoding result and outputs the data symbols to radio transmitting section 109. 16QAM is used as a modulation scheme here as in the mobile station.

On the other hand, if there are no errors in the decoding result (FIG. 4) in decoding section 104 (if the error determination result is "OK"), selecting section 107 selects the bit sequence (FIG. 5) inputted from encoding section 106 and outputs it to modulating section 108. That is, if there are no errors in the decoding result in decoding section 104, as shown in FIG. 5, modulating section 108 generates data symbols #1 to #4 formed with systematic bits $S_1'$ to $S_8'$ and parity bits $P_1'$ to $P_8'$ by modulating the bit sequence and outputs the generated data symbols to radio transmitting section 109. 16QAM is used here as the modulation scheme as described above.

Radio transmitting section 109 performs radio processing including up-conversion on the data symbols inputted from modulating section 108 and transmits the data symbols after radio processing to the base station via antenna 101.

Here, in the mobile communication system shown in FIG. 1, there are cases where there are errors in the decoding result in relay station 1 but there are no errors in the decoding result in relay station 2. In this case, modulating section 108 modulates the systematic bits and the parity bits separately as shown in FIG. 5 so as to combine easily the systematic bits from relay station 1 and the systematic bits from relay station 2. This modulation enables relay station 1 and relay station 2 to transmit the data symbols formed with the same systematic bits (FIGS. 4 and 5) to the base station at the same timing, so that the base station can easily combine the data symbols formed with the same systematic bits. When the channels between relay station 1 and the base station and between relay station 2 and the base station can be demultiplexed, it is not particularly necessary to transmit the data symbols formed with the same systematic bits from relay station 1 and relay station 2 at the same timing.

The reason that relay station 100 transmits the parity bits generated by error correcting encoding in encoding section 106 to the base station only when there are no errors in the decoding result in decoding section 104 is that, when there are errors in the decoding result in decoding section 104, the reliability of the parity bits acquired from the decoding result is very low.

Figure 6:
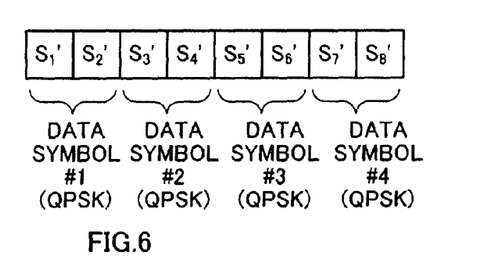
FIG. 6 illustrates a decoding result according to Embodiment 1 (modulation scheme: QPSK)

Moreover, with the present embodiment, modulating section 108 may set the modulation level in the decoding result with errors in decoding section 104 lower than the modulation level in the decoding result without errors in decoding section 104. For example, when the modulation scheme without errors is 16QAM as described above, the modulation scheme with errors is QPSK as shown in FIG. 6. This is to reduce the error rate of systematic bits having errors between the relay station and the base station by reducing modulation level using bands allocated for the parity bits, given that the parity bits are not transmitted when there are errors in the decoding result in decoding section 104.

In this way, according to the present embodiment, it is possible to prevent propagation of errors and obtain diversity effect in the base station.

(Embodiment 2)

Even there are errors in the decoding result (FIG. 4) in decoding section 104, the reliability of parity bits $P_1$ to $P_8$ included in the received data symbols (FIG. 3) may be high.

Then, when there are errors in the decoding result formed with systematic bits after error correcting decoding, the relay station of the present embodiment is the same as Embodiment 1 in transmitting data symbols including systematic bits to the base station, and is different from Embodiment 1 in including parity bits after a hard decision into the data symbols.

Figure 7:
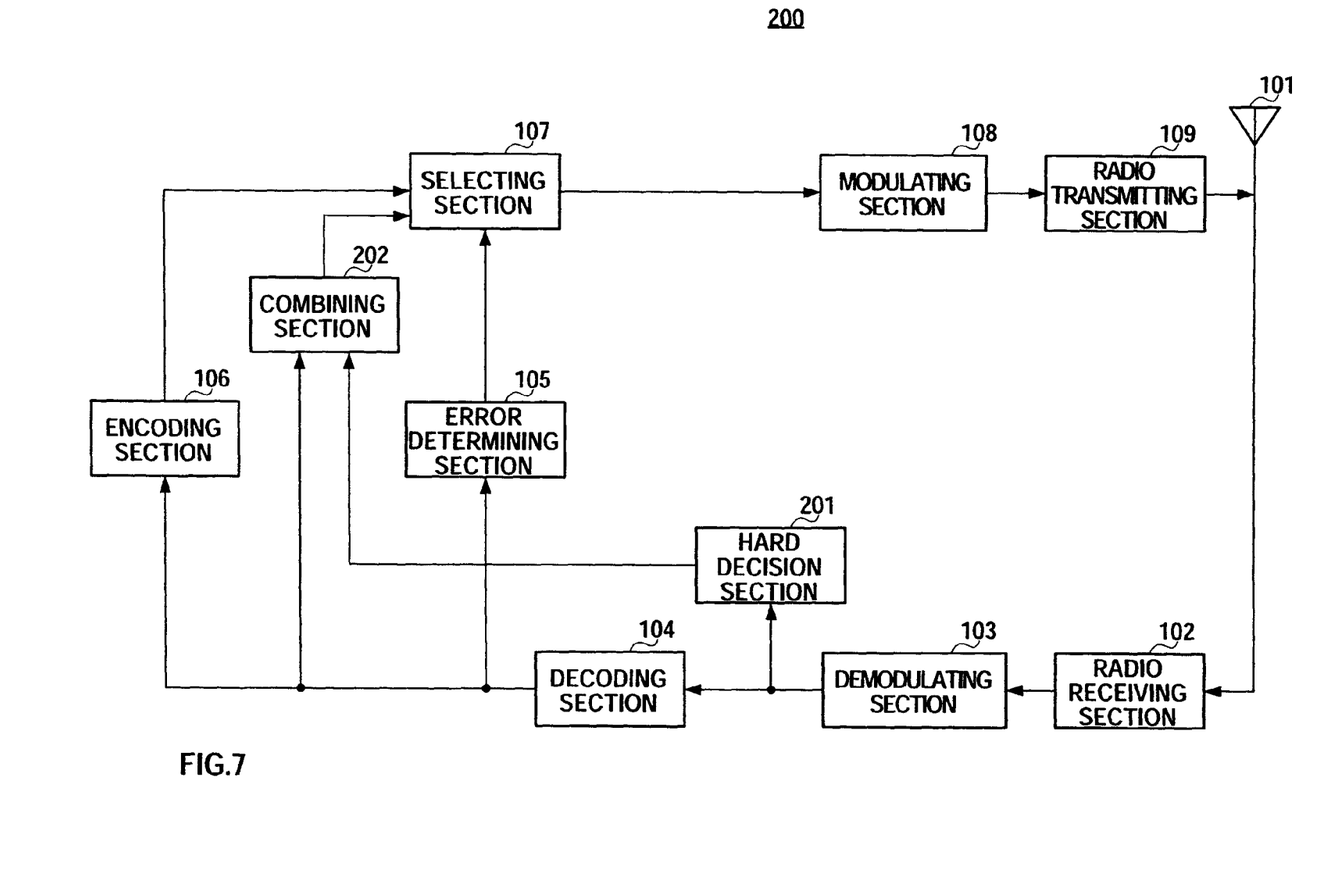
FIG. 7 is a block diagram showing a configuration of the relay station according to Embodiment 2.

FIG. 7 shows the configuration of relay station 200 according to the present embodiment. In FIG. 7, the same components as Embodiment 1 (FIG. 2) will be assigned the same reference numerals and description thereof will be omitted.

Systematic bits $S_1$ to $S_8$ and parity bits $P_1$ to $P_8$ acquired in demodulating section 103 are inputted to decoding section 104 and hard decision section 201.

Hard decision section 201 makes a hard decision on parity bits $P_1$ to $P_8$, to acquires parity bits $P_1''$ to $P_8''$. Then, hard decision section 201 outputs the parity bit sequence after hard decision to combining section 202.

The decoding result (FIG. 4) acquired in decoding section 104 is inputted to error determining section 105, encoding section 106 and combining section 202.

Figure 8:
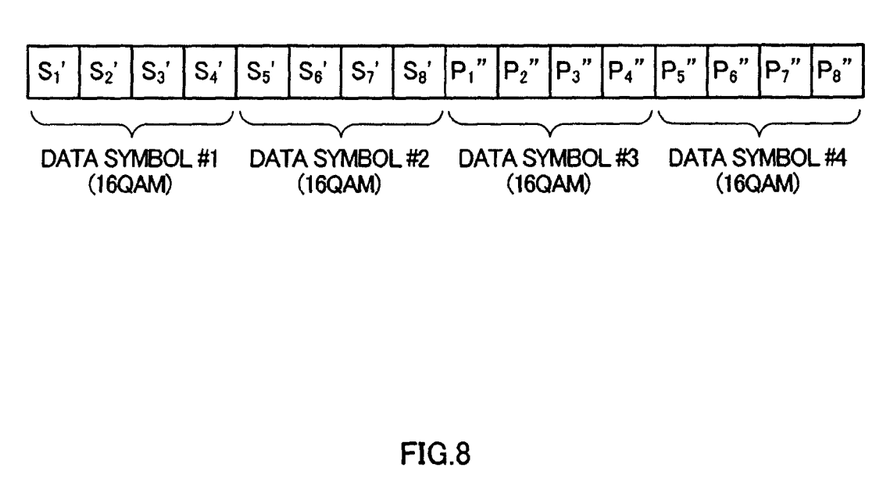
FIG. 8 shows a bit sequence after the combination according to Embodiment 2.

Combining section 202 combines the bit sequence inputted from hard decision section 201 and the bit sequence inputted from decoding section 104 as shown in FIG. 8, and outputs the combined bit sequence to selecting section 107.

According to the determination result in error determining section 105, selecting section 107 selects either the bit sequence (FIG. 8) inputted from combining section 202 orbit sequence (FIG. 5) inputted from encoding section 106 and outputs the selected bit sequence to modulating section 108.

The operations of selecting section 107 when there are no errors in the decoding result (FIG. 4) in decoding section 104 will be the same as in Embodiment 1 and description thereof will be omitted.

On the other hand, when there are errors in the decoding result in decoding section 104, selecting section 107 selects the bit sequence (FIG. 8) inputted from combining section 202 and outputs the selected bit sequence to modulating section 108. That is, when there are errors in the decoding result in decoding section 104, modulating section 108 modulates the bit sequence as shown in FIG. 8 to generate data symbols #1 to #4 formed with systematic bits $S_1'$ to $S_8'$ and parity bits $P_1''$ to $P_8''$, and outputs the generated data symbols to radio transmitting section 109.

In this way, according to the present embodiment, when there are errors in a decoding result in decoding section 104, the parity bits after a hard decision are set in a relay transmission target, so that the base station can obtain diversity effect for parity bits as well even when there are errors in the decoding result in decoding section 104.

(Embodiment 3)

Figure 9:
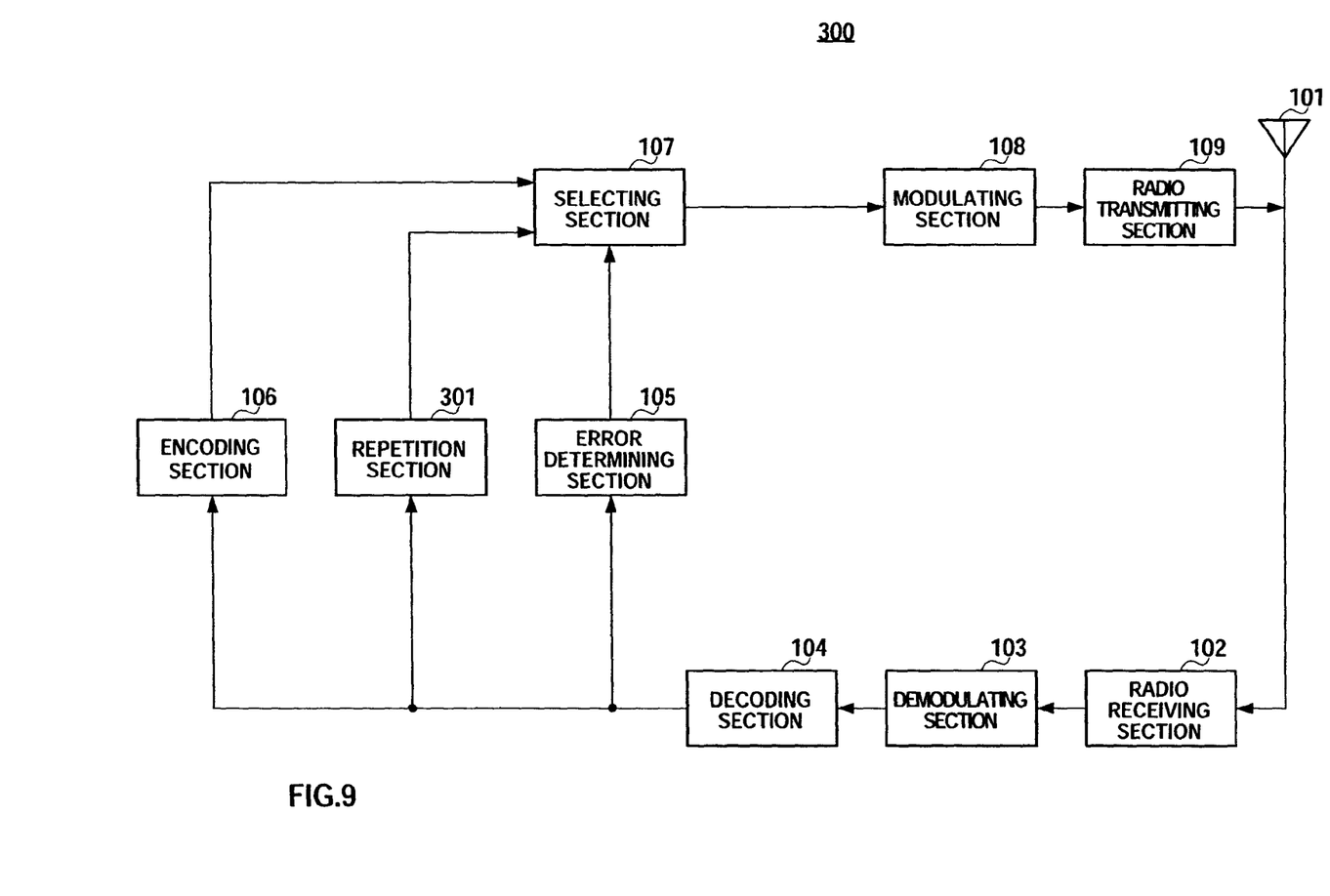
FIG. 9 is a block diagram showing a configuration of the relay station according to Embodiment 3.

FIG. 9 shows the configuration of relay station 300 according to the present embodiment. In FIG. 9, the same components as Embodiment 1 (FIG. 2) will be assigned the same reference numerals and description thereof will be omitted.

The decoding result (FIG. 4) acquired in decoding section 104 is inputted to error determining section 105, encoding section 106 and repetition section 301.

Figure 10:
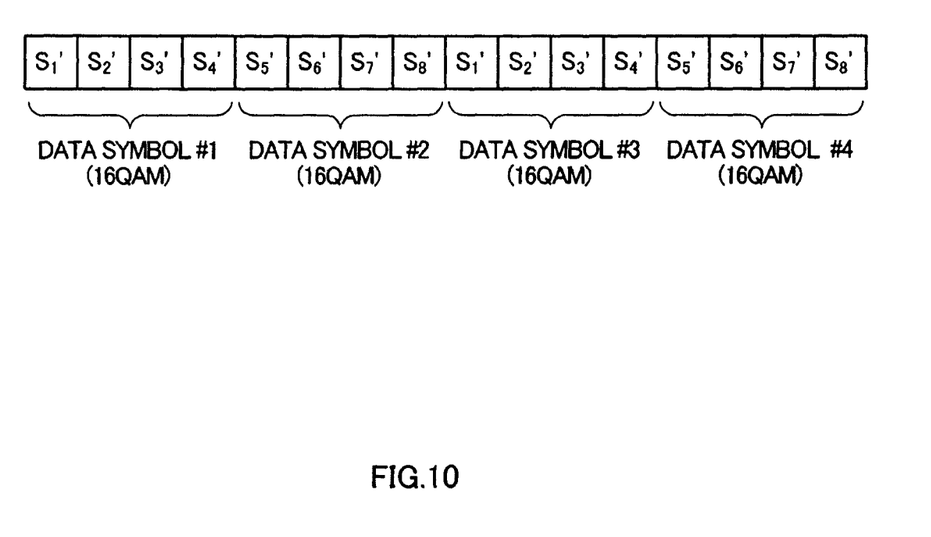
FIG. 10 shows a bit sequence after repetition according to Embodiment 3.

Repetition section 301 repeats (i.e. duplicates) systematic bits $S_1'$ to $S_8'$ of the decoding result. To fix the transmission rate whether the bit sequence inputted from repetition section 301 is selected or the bit sequence (FIG. 5) inputted from encoding section 106 is selected in selecting section 107, the repetition factor (RF) here is two to match the coding rate R=½ in encoding section 106. That is, the bit sequence after repetition is as shown in FIG. 10, and the same systematic bits in twos are acquired when the RF is 2. Then repetition section 301 outputs the bit sequence shown in FIG. 10 to selecting section 107.

According to the determination result in error determining section 105, selecting section 107 selects either the bit sequence (FIG. 10) inputted from repetition section 301 or the bit sequence (FIG. 5) inputted from encoding section 106 and outputs the selected bit sequence to modulating section 108.

The operations of selecting section 107 where there are no errors in the decoding result (FIG. 4) in decoding section 104 will be the same as in Embodiment 1 and description thereof will be omitted.

On the other hand, when there are errors in the decoding result (FIG. 4) in decoding section 104, selecting section 107 selects the bit sequence (FIG. 10) inputted from repetition section 301 and outputs the selected bit sequence to modulating section 108. That is, when there are errors in the decoding result in decoding section 104, modulating section 108 modulates the bit sequence including a plurality of the same systematic bits as shown in FIG. 10 to generate data symbols #1 to #4 formed with systematic bits $S_1'$ to $S_8'$ alone, and outputs the generated data symbols to radio transmitting section 109.

In this way, according to the present embodiment, when there are errors in a decoding result in decoding section 104, the systematic bits duplicated and generated are set in a relay transmission target, so that the base station can further improve the diversity effect for systematic bits by combining the same systematic bits.

(Embodiment 4)

Figure 11:
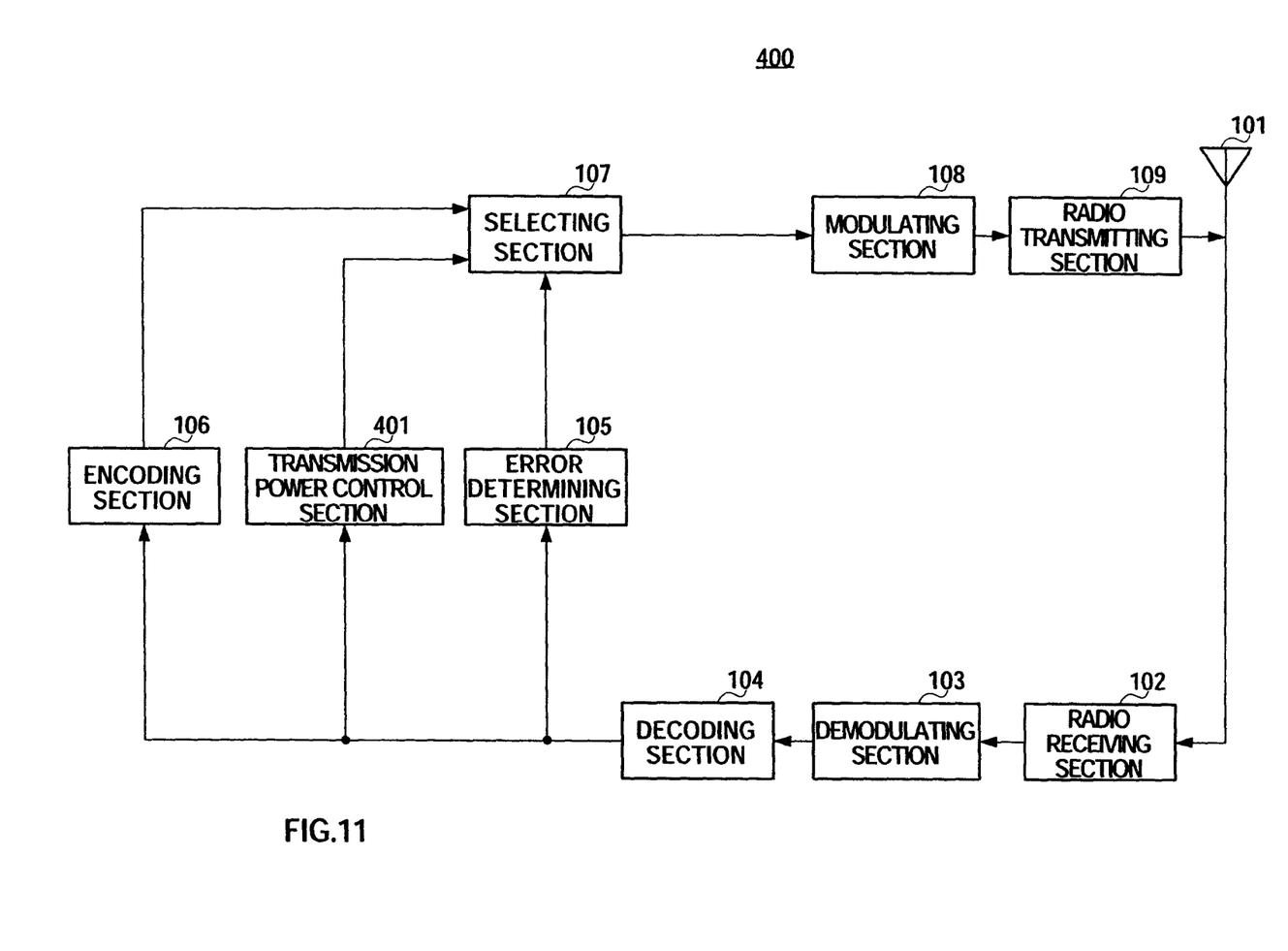
FIG. 11 is a block diagram showing a configuration of the relay station according to Embodiment 4.

FIG. 11 shows the configuration of relay station 400 according to the present embodiment. In FIG. 11, the same components as Embodiment 1 (FIG. 2) will be assigned the same reference numerals and description thereof will be omitted.

The decoding result (FIG. 4) acquired in decoding section 104 is inputted to error determining section 105, encoding section 106 and transmission power control section 401.

Here, with the present embodiment, when there are errors in a decoding result in decoding section 104, as in Embodiment 1, to generate a data symbol formed with systematic bits alone and not including parity bits, the transmission power required to transmit the parity bits can be assigned to the systematic bits.

Then, transmission power control section 401 increases the transmission power for systematic bits $S_1'$ to $S_8'$ of the decoding result by a proportion required to transmit parity bits. Then, transmission power control section 401 outputs the decoding result after transmission power increase (i.e. systematic bits $S_1'$ to $S_8'$ after transmission power increase) to selecting section 107.

Processing after this is the same as processing in Embodiment 1, and the description thereof is omitted.

In this way, according to the present embodiment, when there are errors in a decoding result in decoding section 104, systematic bits with increased transmission power are set in a relay transmission target, so that it is possible to improve the error rate performances of the systematic bits and the base station can further improve the diversity effect for systematic bits.

(Embodiment 5)

When the channel quality of received data symbols is low in relay station 100 (FIG. 2), it is assumed that the number of systematic bits with errors increases in the systematic bits included in the decoding result in decoding section 104. In case there are a large number of systematic bits with errors in the decoding result in decoding section 104 as such, if the relay station 100 transmits data symbols generated from the decoding result to the base station, propagation of errors cannot be prevented, and error performances degrade.

Then, the relay station of the present embodiment does not transmit data symbols including systematic bits with errors, to the base station, when the channel quality of the received data symbols is less than a threshold.

Figure 12:
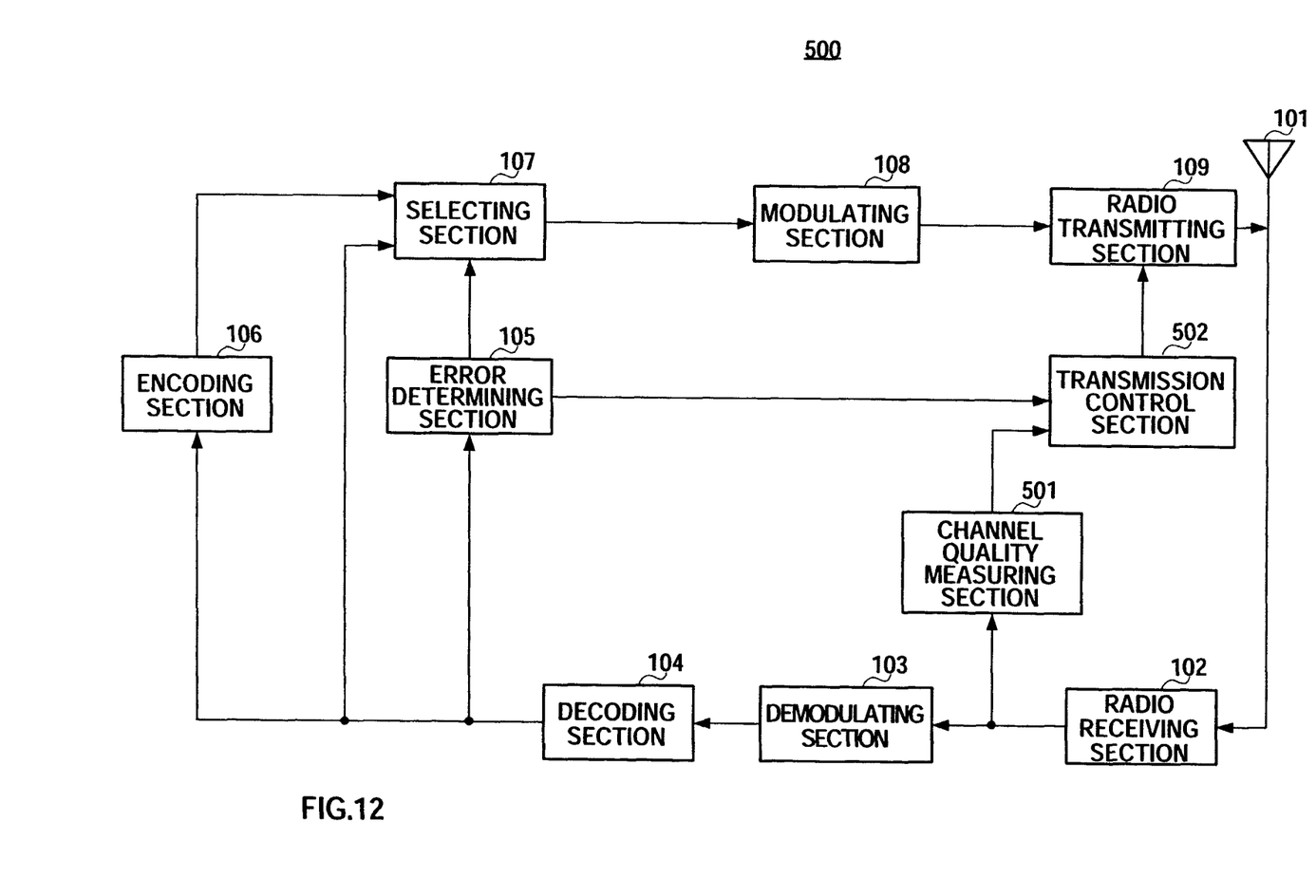
FIG. 12 is a block diagram showing a configuration of the relay station according to Embodiment 5.

FIG. 12 shows the configuration of relay station 500 according to the present embodiment. In FIG. 12, the same components as Embodiment 1 (FIG. 2) will be assigned the same reference numerals and description thereof will be omitted.

Data symbols subjected to radio processing in radio receiving section 102 are inputted to demodulating section 103 and channel quality measuring section 501.

Channel quality measuring section 501 measures the channel quality of the received data symbols and outputs the measured result to transmission control section 502. Channel quality measuring section 501 measures channel quality using, for example, SIR, SNR, SINR, CIR, CNR, CINR, RSSI, received intensity, received power, interference power, error rate, transmission rate, throughput, the amount of interference, channel fluctuation, moving speed of the mobile station and MCS that achieves a predetermined error rate. Channel quality is also referred to as received quality, CQI (Channel Quality Information), CSI (Channel State Information) and so on.

Moreover, the determination result in error determining section 105 is inputted to selecting section 107 and transmission control section 502.

Transmission control section 502 controls the operations of radio transmitting section 109 according to the channel quality of the received data symbols and the determination result in error determining section 105.

When there are no errors in the decoding result (FIG. 4) in decoding section 104, transmission control section 502 starts radio transmitting section 109 regardless of the channel quality of the received data symbols. Accordingly, in this case, radio transmitting section 109 transmits data symbols #1 to #4 formed with systematic bits $S_1'$ to $S_8'$ and parity bits $P_1'$ to $P_8'$ (FIG. 5).

On the other hand, when there are errors in the decoding result (FIG. 4) in decoding section 104, transmission control section 502 compares the channel quality of the received data symbols and a threshold.

Then, when channel quality of received data symbol is equal to or more than the threshold, transmission control section 502 starts radio transmitting section 109. Accordingly, in this case, radio transmitting section 109 transmits the data symbols formed with systematic bits $S_1'$ to $S_8'$ (FIG. 4) alone.

On the other hand, if channel quality of the received data symbols is less than the threshold, transmission control section 502 stops operations of radio transmitting section 109. Accordingly, in this case, radio transmitting section 109 stops transmission. That is, in this case, radio transmitting section 109 does not transmit the data symbols formed with systematic bits $S_1'$ to $S_8'$ (FIG. 4) alone.

The present embodiment may also be implemented in combination with Embodiment 2.

Moreover, in a case where the present embodiment is implemented in combination with Embodiment 2, a plurality of thresholds may be used. For example, two thresholds of threshold A and threshold B higher than threshold A are used, to control whether or not to transmit the data symbols formed with systematic bits $S_1'$ to $S_8'$ by threshold A and control whether or not to transmit the data symbols formed with parity bits $P_1''$ to $P_8''$ by threshold B. This is to transmit both systematic bits and parity bit because the error rate is low when channel quality is high, and transmit systematic bits alone having the error rate lower than parity bits because the error rate is high when channel quality is low.

In this way, according to the present embodiment, it is possible to prevent propagation of errors that may occur when the channel quality of received data symbols is low and prevent degradation of error rate performances due to this propagation of errors.

Embodiments of the present invention have been explained.

With the embodiments above, the number of relay stations may be equal to or more than three.

Moreover, with the embodiments, additional relay stations may be placed between the relay station and the base station or between the mobile station and the relay station.

The relay station of the embodiments above may transmit information that can distinguish between data symbols including systematic bits with errors and data symbols not including systematic bits with errors. For example, the base station can distinguish the both data symbols by assigning the flag "1" to the beginning of the frame formed with the data symbols including systematic bits with errors and assigning the flag "0" to the beginning of the frame formed with the data symbols not including systematic bits with errors in the relay station.

Moreover, the base station and the mobile station according to the embodiments may be referred to as "Node B" and "UE," respectively. Furthermore, the relay station according to the embodiments is referred to as "repeater," "simple base station," "cluster head," and so on.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-053900, filed on Feb. 28, 2006, including the specification, drawings and abstract, is incorporated herein by reference in its entirety.

INDUSTRIAL APPLICABILITY

The present invention is applicable to communication systems in which radio communication apparatuses such as mobile stations and base stations carry out radio transmission through relay stations, for example, multihop systems.

The invention claimed is:

1. A radio communication apparatus that performs relay transmission between a first radio communication apparatus and a second radio communication apparatus, the radio communication apparatus comprising:

a circuit, the circuit comprising:
a receiving section that receives a first data symbol from the first radio communication apparatus, the first data symbol being formed with first systematic bits and first parity bits, and the first systematic bits and the first parity bits being subjected to error correction encoding;
a demodulating section that demodulates the first data symbol to acquire the first systematic bits and the first parity bits;
a decoding section that performs error correction decoding on the first systematic bits using the first parity bits to acquire a decoding result, the decoding result being formed with second systematic bits after the error correction decoding;
an error determining section that determines whether or not there are errors in the decoding result;
an encoding section that performs the error correction encoding on the decoding result to acquire third systematic bits and third parity bits, the third systematic bits and the third parity bits being subjected to the error correction encoding;
a selecting section that selects the second systematic bits when there are errors in the decoding result, and selects the third systematic bits and the third parity bits when there are no errors in the decoding result;
a modulating section that modulates the result selected by the selecting section to generate a second data symbol, the second data symbol including the second systematic bits when there are errors in the decoding result, and the second data symbol being formed with the third systematic bits and the third parity bits when there are no errors in the decoding result; and
a transmitting section that transmits the second data symbol to the second radio communication apparatus.

2. The radio communication apparatus according to claim 1, wherein the modulating section generates the second data symbol formed with the second systematic bits alone when there are errors in the decoding result.

3. The radio communication apparatus according to claim 2, further comprising a control section that increases transmission power for the second systematic bits by a proportion required to transmit parity bits,
wherein the modulating section generates the second data symbol formed with the second systematic bits alone, the second data symbol being subjected to the transmission power increase by the control section.

4. The radio communication apparatus according to claim 2, further comprising a duplication section that duplicates the second systematic bits to acquire a plurality of the same second systematic bits,
wherein the modulating section generates the second data symbol formed with the plurality of the same second systematic bits alone.

5. The radio communication apparatus according to claim 2, further comprising a hard decision section that makes a hard decision on the first parity bits to acquire second parity bits after the hard decision,
wherein the modulating section generates the second data symbol formed with the second systematic bits and the second parity bits when there are errors in the decoding result.

6. A relay transmission method performed by a radio communication apparatus that performs relay transmission between a first radio communication apparatus and a second radio communication apparatus, the relay transmission method comprising:
receiving a first data symbol from the first radio communication apparatus, the first data symbol being formed with first systematic bits and first parity bits, the first systematic bits and the first parity bits being subjected to error correction encoding;

demodulating the first data symbol to acquire the first systematic bits and the first parity bits;

performing error correction decoding on the first systematic bits using the first parity bits to acquire a decoding result, the decoding result being formed with second systematic bits after the error correction decoding;

determining whether or not there are errors in the decoding result;

performing error correction encoding on the decoding result to acquire third systematic bits and third parity bits, the third systematic bits and the third parity bits being subjected to the error correction encoding;

selecting the second systematic bits when there are errors in the decoding result and the third systematic bits and the third parity bits when there are no errors in the decoding result;

modulating the result selected by the selecting to generate a second data symbol, the second data symbol including the second systematic bits when there are errors in the decoding result, and the second data symbol being formed with the third systematic bits and the third parity bits when there are no errors in the decoding result; and transmitting the second data symbol to the second radio communication apparatus.

* * * * *